US011157125B2

(12) United States Patent
Chen

(10) Patent No.: US 11,157,125 B2
(45) Date of Patent: Oct. 26, 2021

(54) TOUCH PANEL IMPLEMENTING TOUCH AND PRESSURE SENSING PERFORMANCES AND RELATED TOUCH DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventor: Bi Chen, Wuhan (CN)

( * ) Notice: Subject to any disclaimer, the term of this patent is extended or adjusted under 35 U.S.C. 154(b) by 297 days.

(21) Appl. No.: 16/347,818

(22) PCT Filed: Apr. 15, 2019

(86) PCT No.: PCT/CN2019/082603
§ 371 (c)(1),
(2) Date: May 7, 2019

(87) PCT Pub. No.: WO2020/118989
PCT Pub. Date: Jun. 18, 2020

(65) Prior Publication Data
US 2021/0181898 A1 Jun. 17, 2021

(30) Foreign Application Priority Data
Dec. 14, 2018 (CN) .......................... 201811531321.9

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0445* (2019.05); *G06F 2203/04105* (2013.01)

(58) Field of Classification Search
CPC .... G06F 3/0445; G06F 3/0446; G06F 3/0448; G06F 3/0412; G06F 3/04164; G06F 3/0443; G06F 2203/04105; G06F 3/0414; G06F 2203/04111; G02F 1/1343; G02F 1/13338; G02F 2201/122
See application file for complete search history.

(56) References Cited

U.S. PATENT DOCUMENTS

| 9,170,699 | B2* | 10/2015 | Xi | ........................... G06F 3/046 |
| 10,296,118 | B2* | 5/2019 | Song | ..................... G06F 3/0412 |
| 10,310,682 | B2* | 6/2019 | Lu | ....................... G06F 3/04166 |
| 2007/0008299 | A1* | 1/2007 | Hristov | .............. G06F 3/04186 |
| | | | | 345/173 |

(Continued)

FOREIGN PATENT DOCUMENTS

| CN | 104220964 A | 12/2014 |
| CN | 106569631 A | 4/2017 |

(Continued)

*Primary Examiner* — Rodney Amadiz

(57) ABSTRACT

A touch panel and a display device are provided to simultaneously implement touch and pressure sensing performances through a first electrode and a second electrode, such that the pressure sensing performance can be realized without adding an independent pressure sensing layer in a terminal. This solves a technical problem that a current terminal needs to increase the independent pressure sensing layer to realize the pressure sensing performance.

10 Claims, 4 Drawing Sheets

(56) References Cited

U.S. PATENT DOCUMENTS

| | | | | |
|---|---|---|---|---|
| 2009/0194344 A1* | 8/2009 | Harley | .................. | G06F 3/0446 |
| | | | | 178/18.06 |
| 2013/0009905 A1* | 1/2013 | Castillo | ................ | G06F 3/0414 |
| | | | | 345/174 |
| 2013/0285970 A1 | 10/2013 | Ahn et al. | | |
| 2014/0028926 A1* | 1/2014 | Jiang | ..................... | G06F 3/0446 |
| | | | | 349/12 |
| 2014/0049505 A1* | 2/2014 | Radivojevic | ........ | G06F 3/03547 |
| | | | | 345/174 |
| 2014/0160368 A1* | 6/2014 | Huang | .................. | G06F 3/0446 |
| | | | | 349/12 |
| 2014/0192027 A1* | 7/2014 | Ksondzyk | ............ | G01R 35/005 |
| | | | | 345/178 |
| 2014/0267128 A1* | 9/2014 | Bulea | ................. | G06F 3/04166 |
| | | | | 345/174 |
| 2014/0313169 A1* | 10/2014 | Kravets | .............. | G01R 27/2605 |
| | | | | 345/178 |
| 2015/0309625 A1* | 10/2015 | Huang | .................. | G06F 3/0418 |
| | | | | 345/174 |
| 2016/0328047 A1* | 11/2016 | Jin | ....................... | G06F 3/04166 |
| 2017/0010719 A1* | 1/2017 | Chen | ..................... | G06F 3/0445 |
| 2017/0060329 A1* | 3/2017 | Yoon | .................... | G06F 3/0447 |
| 2017/0139510 A1* | 5/2017 | Lang | .................... | G01L 5/0038 |
| 2017/0160854 A1* | 6/2017 | Huang | .................. | G06F 3/0447 |
| 2017/0371471 A1 | 12/2017 | Kim et al. | | |
| 2018/0224992 A1 | 8/2018 | Hong et al. | | |
| 2021/0064168 A1* | 3/2021 | Gong | ................... | H01L 27/323 |

FOREIGN PATENT DOCUMENTS

| | | |
|---|---|---|
| CN | 207557907 U | 6/2018 |
| CN | 108388369 A | 8/2018 |

\* cited by examiner

TOUCH PANEL IMPLEMENTING TOUCH AND PRESSURE SENSING PERFORMANCES AND RELATED TOUCH DISPLAY PANEL

FIELD OF INVENTION

The present disclosure relates to the field of touch technologies, and more particularly to a touch panel and a display device.

BACKGROUND OF INVENTION

With the development of mobile phone technologies, terminals such as mobile phones support touch and pressure sensing performances.

In the prior art, in order to implement the touch and pressure sensing performances, as illustrated in FIG. 1, a touch layer needs to be provided in a terminal to implement the touch performance, and a pressure sensing layer needs to be provided in the terminal to implement the pressure sensing performance. This requires the terminal to add an independent pressure sensing layer, which increases a thickness of a product.

That is to say, there is a technical problem that a current terminal needs to add the independent pressure sensing layer to realize the pressure sensing performance.

SUMMARY OF INVENTION

The present disclosure provides a touch panel and a display device to solve a technical problem that a current terminal needs to add an independent pressure sensing layer to realize a pressure sensing performance.

To solve the above issues, a technical solution provided by the present disclosure is as follows.

An embodiment of the present disclosure provides a touch panel. The touch panel includes a flexible substrate, a first electrode, a second electrode, a touch chip, and a pressure sensing chip. The first electrode is disposed on the flexible substrate. A shape of the first electrode is deformed according to deformation of the flexible substrate. A resistance value of the first electrode is correlated with a shape variable of the shape of the first electrode. The second electrode is disposed on the flexible substrate. The second electrode is insulated from the first electrode to form a capacitor. The touch chip is electrically connected to the first electrode and the second electrode to identify a touch operation according to a change in a capacitance value of the capacitor. The pressure sensing chip is electrically connected to at least the first electrode and identifies a pressing operation according to a change in the resistance value of the first electrode.

In an embodiment of the present disclosure, the first electrode includes a first stem and at least one first branch, a length of the first branch increases as a shape variable of the flexible substrate increases, and a resistance value of the first branch is positively correlated with a length value of the first branch.

In an embodiment of the present disclosure, the first branch is a conductive loop formed by a hollow wire.

In an embodiment of the present disclosure, the first branch is a swing configuration.

In an embodiment of the present disclosure, the pressure sensing chip is further electrically connected to the second electrode and identifies a pressing operation according to a change in the resistance value of the first electrode and a change in a resistance value of the second electrode, the second electrode includes a second stem and at least one second branch, a length of the second branch increases as the shape variable of the flexible substrate increases, and a resistance value of the second branch is positively correlated with a length value of the second branch.

In an embodiment of the present disclosure, projections of the first branch and the second branch on a surface of the flexible substrate do not overlap.

In an embodiment of the present disclosure, the second branch and the first branch are conductive loops formed by hollow wires, and the second branch and the first branch are arranged in a spiral shape.

In an embodiment of the present disclosure, the second electrode is disposed in a same layer as the first electrode.

In an embodiment of the present disclosure, the second electrode and the first electrode are each patterned by a transparent conductive layer.

In an embodiment of the present disclosure, one of the first electrode and the second electrode is a signal sensing electrode, and the other of the first electrode and the second electrode is a signal driving electrode.

An embodiment of the present disclosure provides a display device including a touch panel. The touch panel includes a flexible substrate, a first electrode, a second electrode, a touch chip, and a pressure sensing chip. The first electrode is disposed on the flexible substrate. A shape of the first electrode is deformed according to deformation of the flexible substrate. A resistance value of the first electrode is correlated with a shape variable of the shape of the first electrode. The second electrode is disposed on the flexible substrate. The second electrode is insulated from the first electrode to form a capacitor. The touch chip is electrically connected to the first electrode and the second electrode to identify a touch operation according to a change in a capacitance value of the capacitor. The pressure sensing chip is electrically connected to at least the first electrode and identifies a pressing operation according to a change in the resistance value of the first electrode.

In an embodiment of the present disclosure, the first electrode includes a first stem and at least one first branch, a length of the first branch increases as a shape variable of the flexible substrate increases, and a resistance value of the first branch is positively correlated with a length value of the first branch.

In an embodiment of the present disclosure, the first branch is a conductive loop formed by a hollow wire.

In an embodiment of the present disclosure, the first branch is a swing configuration.

In an embodiment of the present disclosure, the pressure sensing chip is further electrically connected to the second electrode and identifies a pressing operation according to a change in the resistance value of the first electrode and a change in a resistance value of the second electrode, the second electrode includes a second stem and at least one second branch, a length of the second branch increases as the shape variable of the flexible substrate increases, and a resistance value of the second branch is positively correlated with a length value of the second branch.

In an embodiment of the present disclosure, projections of the first branch and the second branch on a surface of the flexible substrate do not overlap.

In an embodiment of the present disclosure, the second branch and the first branch are conductive loops formed by hollow wires, and the second branch and the first branch are arranged in a spiral shape.

In an embodiment of the present disclosure, the second electrode is disposed in a same layer as the first electrode.

In an embodiment of the present disclosure, the second electrode and the first electrode are each patterned by a transparent conductive layer.

In an embodiment of the present disclosure, one of the first electrode and the second electrode is a signal sensing electrode, and the other of the first electrode and the second electrode is a signal driving electrode.

Beneficial effects of the embodiment of present disclosure are that, the embodiment of the present disclosure provides a new touch panel and display device, which include a flexible substrate, a first electrode, a second electrode, a touch chip, and a pressure sensing chip. The first electrode is disposed on the flexible substrate. A shape of the first electrode is deformed according to deformation of the flexible substrate. A resistance value of the first electrode is correlated with a shape variable of the shape of the first electrode. The second electrode is disposed on the flexible substrate. The second electrode is insulated from the first electrode to form a capacitor. The touch chip is electrically connected to the first electrode and the second electrode to identify a touch operation according to a change in a capacitance value of the capacitor. The pressure sensing chip is electrically connected to at least the first electrode and identifies a pressing operation according to a change in the resistance value of the first electrode. In this structure, the shape of the first electrode is deformed according to the deformation of the flexible substrate, and the resistance value of the first electrode is correlated with the shape variable of the shape of the first electrode, such that the shape variable of the flexible substrate can be determined according to the resistance of the first electrode, and the shape variable of the substrate is positively correlated with the pressure pressed by a user. That is, the pressure pressed by the user can be determined according to the resistance of the first electrode, thereby implementing the pressure sensing performance while the second electrode forming a capacitive structure with the first electrode. The touch operation of the user can be determined according to the change of the capacitance. That is, the touch panel of the embodiment of the present disclosure can simultaneously implement the touch and pressure sensing performances through the first electrode and the second electrode. In this way, it is not necessary to add an independent pressure sensing layer in a terminal, thereby realizing the pressure sensing performance, and solving the technical problem that the current terminal needs to add the independent pressure sensing layer to realize the pressure sensing performance.

DESCRIPTION OF DRAWINGS

The accompanying figures to be used in the description of embodiments of the present disclosure or the prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
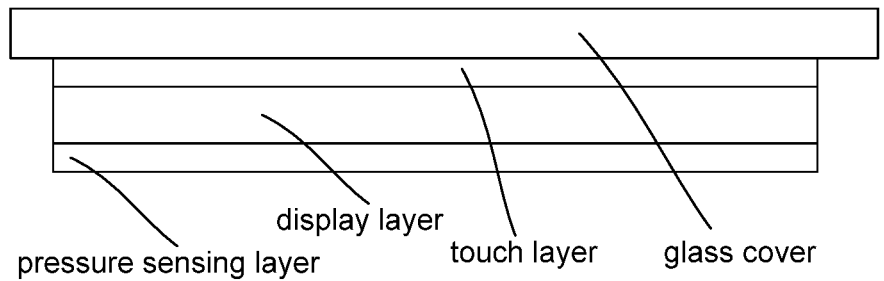
FIG. 1 is a schematic structural diagram of a current touch panel.

The following description of the various embodiments is provided to illustrate the specific embodiments with reference to the accompanying drawings. Directional terms described by the present disclosure, such as top, bottom, front, back, left, right, inner, outer, side, etc., are only directions by referring to the accompanying drawings. Therefore, the directional terms used are for the purpose of illustration and understanding of the present disclosure and are not intended to be limiting of the present disclosure. In the drawings, units with similar structures are labeled with the same reference number.

The embodiment of the present disclosure is directed to solve a technical problem that a current terminal needs to add a pressure sensing layer to realize a pressure sensing performance. The embodiment can solve the defect.

Figure 2:
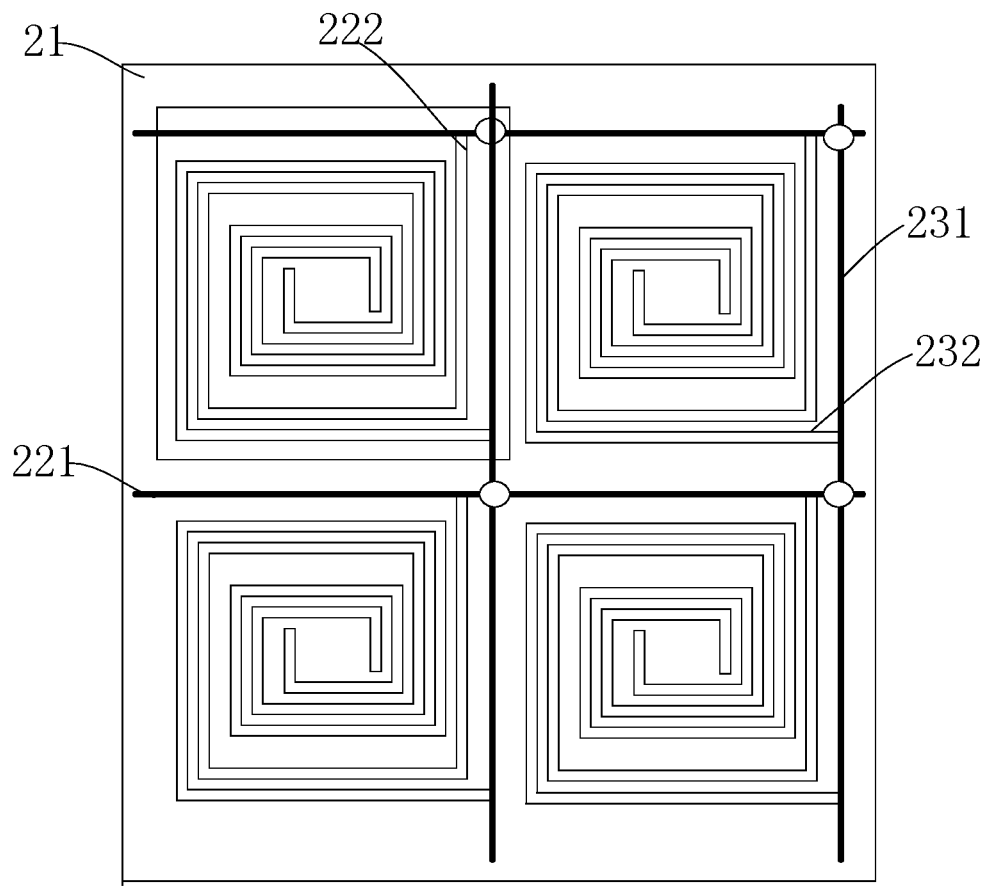
FIG. 2 is a schematic structural diagram of a touch panel according to an embodiment of the present disclosure.

In one embodiment, as illustrated in FIG. 2, a touch panel provided by an embodiment of the present disclosure includes a flexible substrate 21, a first electrode 22, a second electrode 23, a touch chip (not shown in FIG. 2), and a pressure sensing chip (not shown in FIG. 2). The flexible substrate 21 includes a flexible base, a flexible display panel formed with a pixel unit, and the like. The first electrode 22 is disposed on the flexible substrate 21. A shape of the first electrode 22 is deformed according to deformation of the flexible substrate 21. A resistance value of the first electrode 22 is correlated with a shape variable of the shape of the first electrode 22. The second electrode 23 is disposed on the flexible substrate 21. The second electrode 23 is insulated from the first electrode 22 to form a capacitor. The touch chip is electrically connected to the first electrode and the second electrode to identify a touch operation according to a change in a capacitance value of the capacitor. The pressure sensing chip is electrically connected to at least the first electrode and identifies a pressing operation according to a change in the resistance value of the first electrode.

In the embodiment of the present disclosure, the touch panel includes a flexible substrate, a first electrode, a second electrode, a touch chip, and a pressure sensing chip. The first electrode is disposed on the flexible substrate. A shape of the first electrode is deformed according to deformation of the flexible substrate. A resistance value of the first electrode is correlated with a shape variable of the shape of the first electrode. The second electrode is disposed on the flexible substrate. The second electrode is insulated from the first electrode to form a capacitor. The touch chip is electrically connected to the first electrode and the second electrode to identify a touch operation according to a change in a capacitance value of the capacitor. The pressure sensing chip is electrically connected to at least the first electrode and identifies a pressing operation according to a change in the resistance value of the first electrode. In this structure, the shape of the first electrode is deformed according to the deformation of the flexible substrate, and the resistance value of the first electrode is correlated with the shape variable of the shape of the first electrode, such that the shape variable of the flexible substrate can be determined according to the resistance of the first electrode, and the shape variable of the substrate is positively correlated with the pressure pressed by a user. That is, the pressure pressed by the user can be determined according to the resistance of the first electrode, thereby implementing the pressure sensing performance while the second electrode forming a capacitive structure with the first electrode. The touch operation of the user can be determined according to the change of the capacitance. That is, the touch panel of the embodiment of the present disclosure can simultaneously implement the touch and pressure sensing performances through the first electrode and the second electrode. In this way, it is not necessary to add an independent pressure sensing layer in a terminal, thereby realizing the pressure sensing performance, and solving the technical problem that the current terminal needs to add the independent pressure sensing layer to realize the pressure sensing performance.

In one embodiment, correlation includes positive correlation and negative correlation. Positive correlation means that the larger the deformation of the flexible substrate 21, the greater the resistance of the first electrode 22. The negative correlation means that the larger the deformation of the flexible substrate 21, the smaller the resistance of the first electrode 22. The two correlations can achieve the pressure sensing performance.

In one embodiment, as illustrated in FIG. 2, the first electrode 22 includes a first stem 221 and at least one first branch 222, a length of the first branch 222 increases as a shape variable of the flexible substrate 21 increases, and a resistance value of the first branch 222 is positively correlated with a length value of the first branch 222.

In one embodiment, as illustrated in FIG. 2, the first branch 222 is a conductive loop formed by a hollow wire.

In one embodiment, as illustrated in FIG. 2, the first branch is a swing configuration.

In one embodiment, the first branch is a straight-line configuration, an arc configuration, or a combination of various shapes.

In one embodiment, the pressure sensing chip is further electrically connected to the second electrode and identifies a pressing operation according to a change in the resistance value of the first electrode and a change in a resistance value of the second electrode. FIG. 2 illustrates that, the second electrode 23 includes a second stem 231 and at least one second branch 232, a length of the second branch 232 increases as the shape variable of the flexible substrate 21 increases, and a resistance value of the second branch 232 is positively correlated with a length value of the second branch 232.

In one embodiment, FIG. 2 illustrates that, projections of the first branch 222 and the second branch 232 on a surface of the flexible substrate 21 do not overlap.

In one embodiment, the projections of the first branch 222 and the second branch 232 on the surface of the flexible substrate 21 may partially overlap.

In one embodiment, FIG. 2 illustrates that, the second branch 232 and the first branch 222 are conductive loops formed by hollow wires, and the second branch 232 and the first branch 222 are arranged in a spiral shape.

In one embodiment, the second branch 232 and the first branch 222 are both conductive loops formed by hollow wires, but are not staggered.

In one embodiment, one of the second branch 232 and the first branch 222 is a conductive loop formed by a hollow wire, and the other is a planar arrangement.

In one embodiment, as illustrated in FIG. 2, the second electrode 23 is disposed in a same layer as the first electrode 22.

In one embodiment, the second electrode 23 and the first electrode 22 are disposed on opposite surfaces of the flexible substrate.

In one embodiment, the flexible substrate includes a first substrate and a second substrate, the first electrode 22 is disposed on a surface of the first substrate, and the second electrode 23 is disposed on a surface of the second substrate.

In one embodiment, at least one of the first substrate and the second substrate is a plastic film.

In one embodiment, one of the first substrate and the second substrate is a plastic film and the other is a cover sheet.

In one embodiment, the second electrode and the first electrode are each patterned by a transparent conductive layer.

In one embodiment, the transparent conductive layer is a conductive glass layer, such as an ITO layer or the like.

In one embodiment, the second electrode and the first electrode are each patterned by a metal layer.

In one embodiment, the metal layer is a copper layer or the like.

In one embodiment, one of the second electrode and the first electrode is a transparent conductive layer, and the other is a metal layer.

In one embodiment, one of the first electrode and the second electrode is a signal sensing electrode and the other is a signal driving electrode.

The embodiment of the present disclosure will be further described in conjunction with specific application scenarios.

The embodiment discloses a novel pattern design of the touch layer, and the touch performance and the pressure sensing performance are integrated according to a special pattern design.

Figure 3:
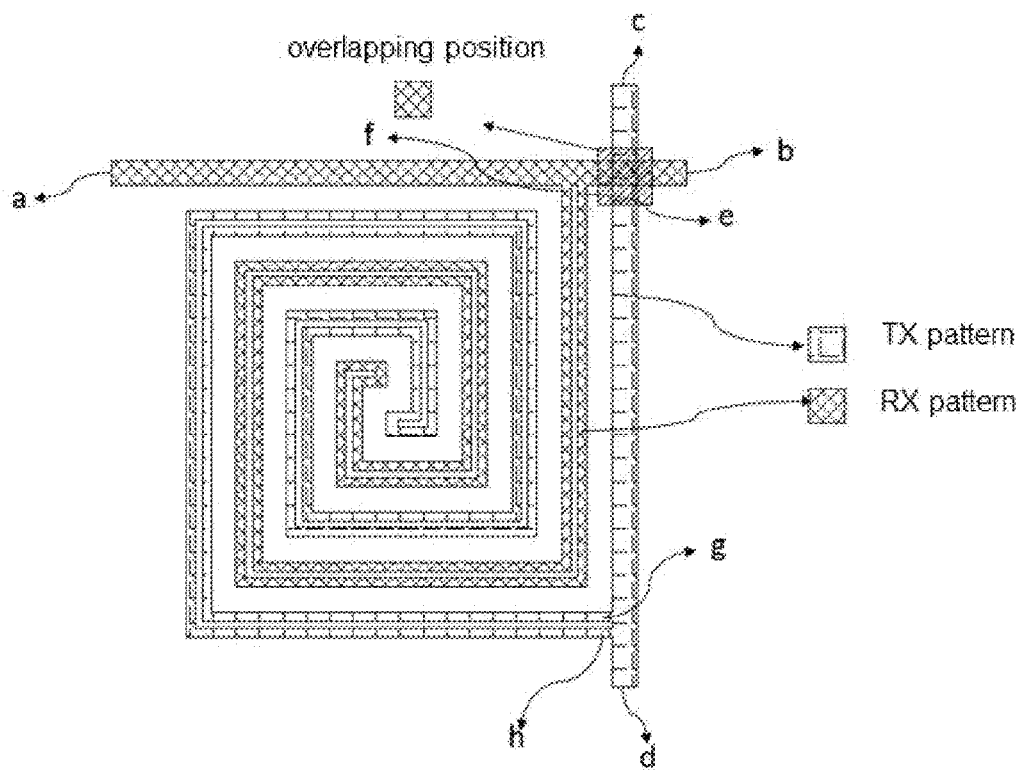
FIG. 3 is a specific structural diagram of a touch panel according to an embodiment of the present disclosure.

As illustrated in FIG. 3, in the embodiment, a transparent metal conductive material is designed into two intertwined patterns, which are a touch sensing electrode (RX) pattern and a touch driving electrode (TX) pattern. A capacitor is formed between the TX and the RX to realize the touch performance. A single touch sensing electrode pattern or a single touch driving electrode pattern is designed as a hollow design to form a conductive loop. When an external finger pressure is applied, the touch sensing electrode pattern or the touch driving electrode pattern has a strain effect, an impedance thereof changes, and the finger pressure is detected according to an impedance change amount.

FIG. 3 is a single functional sensing unit formed by the TX and the RX. The TX or the RX is each formed by a complete pattern. The TX and the RX are intertwined to form a spiral shape. Overlapping positions of the RX and the TX are separated by a transparent insulating layer. In order to accurately recognize a touch signal pressure signal of the finger, a size of a functional sensing unit ranges between 4×4 mm and 6×6 mm.

For implementation of a mutual capacitive touch performance:

The touch driving electrode pattern is a driving unit, and driving signals are input by ports c and d, the RX is a signal receiving end, and receiving signals are fed back by ports a and b. The touch driving electrode pattern and the touch sensing electrode pattern form a mutual capacitance. When the finger is close, a capacitance value changes, and a finger position can be accurately detected according to a capacitance change.

Figure 4:
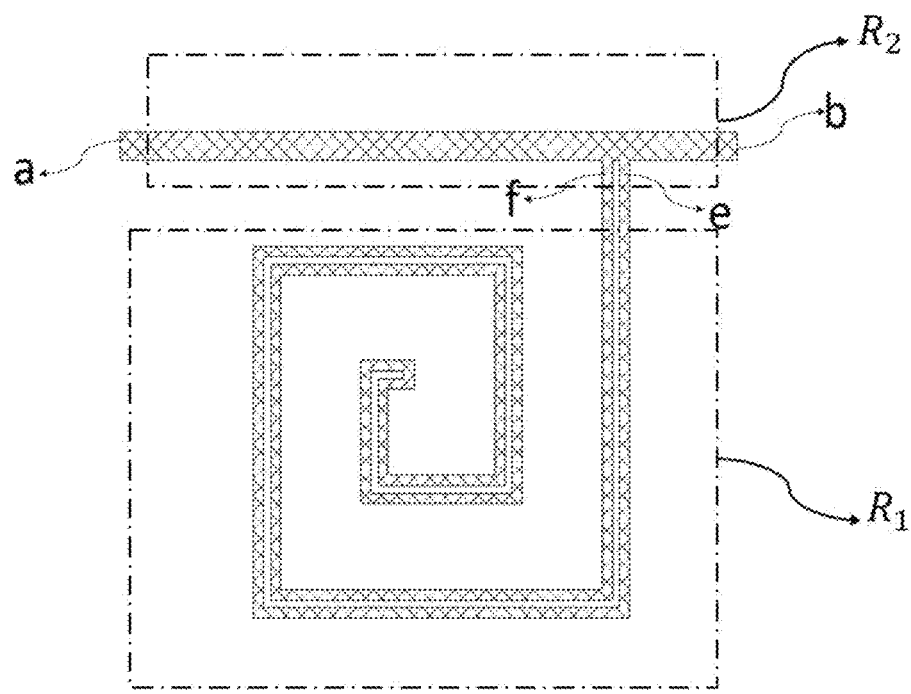
FIG. 4 is a schematic structural diagram of a first electrode of a touch panel according to an embodiment of the present disclosure.
Figure 5:
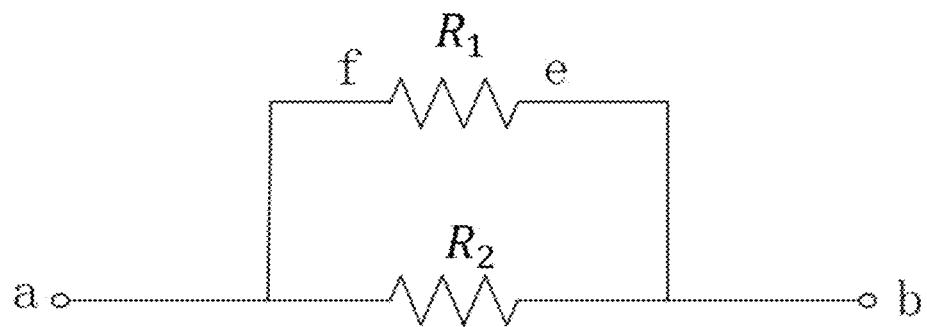
FIG. 5 is a simplified circuit diagram of a first electrode of a touch panel according to an embodiment of the present disclosure.

Implementation of an impedance pressure sensing performance:

As illustrated in FIG. 4, a schematic diagram of a single touch sensing electrode pattern is provided. FIG. 4 can be divided into upper and lower parts represented by a dashed box. The a port to the b port of the upper part is a lead area part, and its impedance is represented by R1. The f port to the e port of the lower part is a functional sensing part, which is a hollow design, and impedance from f to e is represented by R2. An entire touch sensing electrode pattern can be illustrated by a circuit diagram illustrated in FIG. 5, and an impedance value R(RX) of a single touch sensing electrode pattern satisfies: R(RX)=R1*R2÷(R1+R2).

When a function induction coil is subjected to external pressure, a strain effect occurs, and the impedance R2 changes, thus causing R(RX) to change. Different pressures may cause different changes in the impedances of the functional induction coil, such that different pressure values can be recognized.

Figure 6:
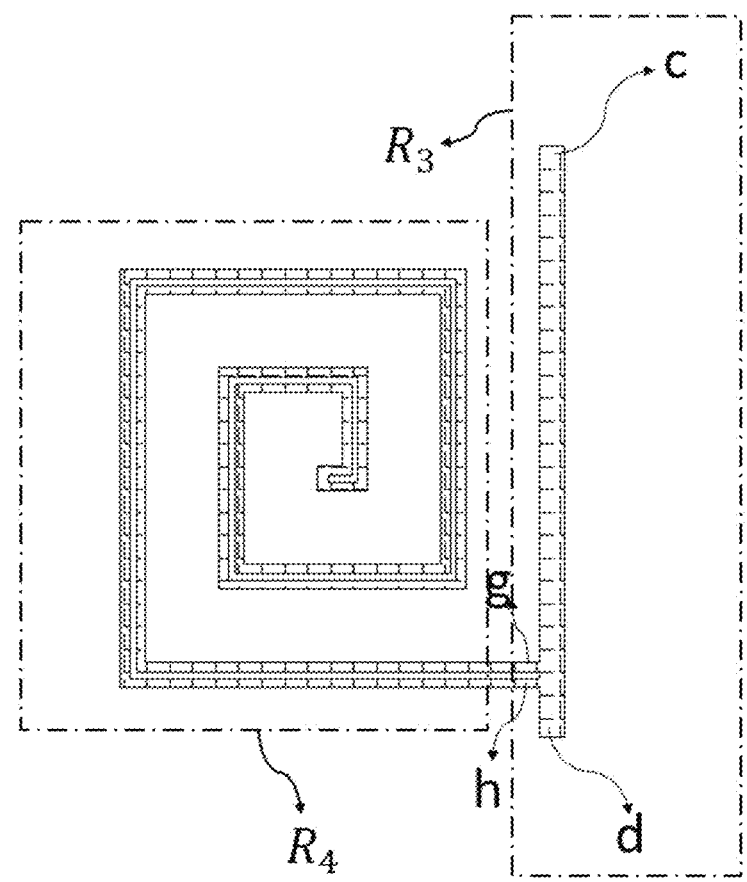
FIG. 6 is a schematic structural diagram of a second electrode of a touch panel according to an embodiment of the present disclosure.
Figure 7:
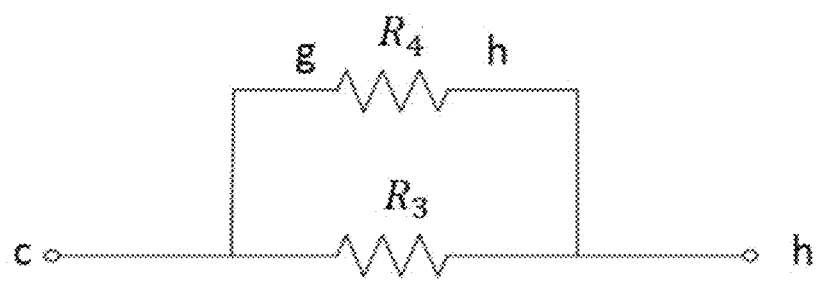
FIG. 7 is a simplified circuit diagram of a second electrode of a touch panel according to an embodiment of the present disclosure.

Similarly, as illustrated in FIG. 6, a schematic diagram of a single touch driving electrode pattern is provided. FIG. 6 can be divided into right and left parts represented by a dashed box. The c port to the d port of the right part is a lead area part, and its impedance is represented by R3. The g port to the h port of the left part is a functional sensing part, which is a hollow design, and impedance from g to h is represented by R4. A single touch driving electrode pattern can also be equivalent to a circuit schematic illustrated in FIG. 7. An impedance value R(TX) of a single touch driving electrode pattern satisfies: R(TX)=R3*R4÷(R3+R4).

R4 represents the impedance of the functional induction coil of the touch driving electrode pattern. When the functional induction coil portion is subjected to external pressure, a strain effect occurs, and the impedance R4 changes, thereby causing a change in R(TX).

The working principle of the pressure sensing function of the embodiment is as follows.

When a finger touches a screen, a mutual capacitive touch performance partially feeds back a coordinate point position, and a pressure sensing touch performance partially returns a pressure magnitude, and a feedback signal can detect coordinates of a touch point and a pressure magnitude signal.

When the finger presses the screen, an impedance of a touch unit changes, the pressure sensing performance is activated, and a mutual capacitive touch enters a sleep state, and magnitude of the pressure can be determined by combining the touch sensing electrode pattern or the impedance variation of the touch driving electrode pattern.

Figure 8:
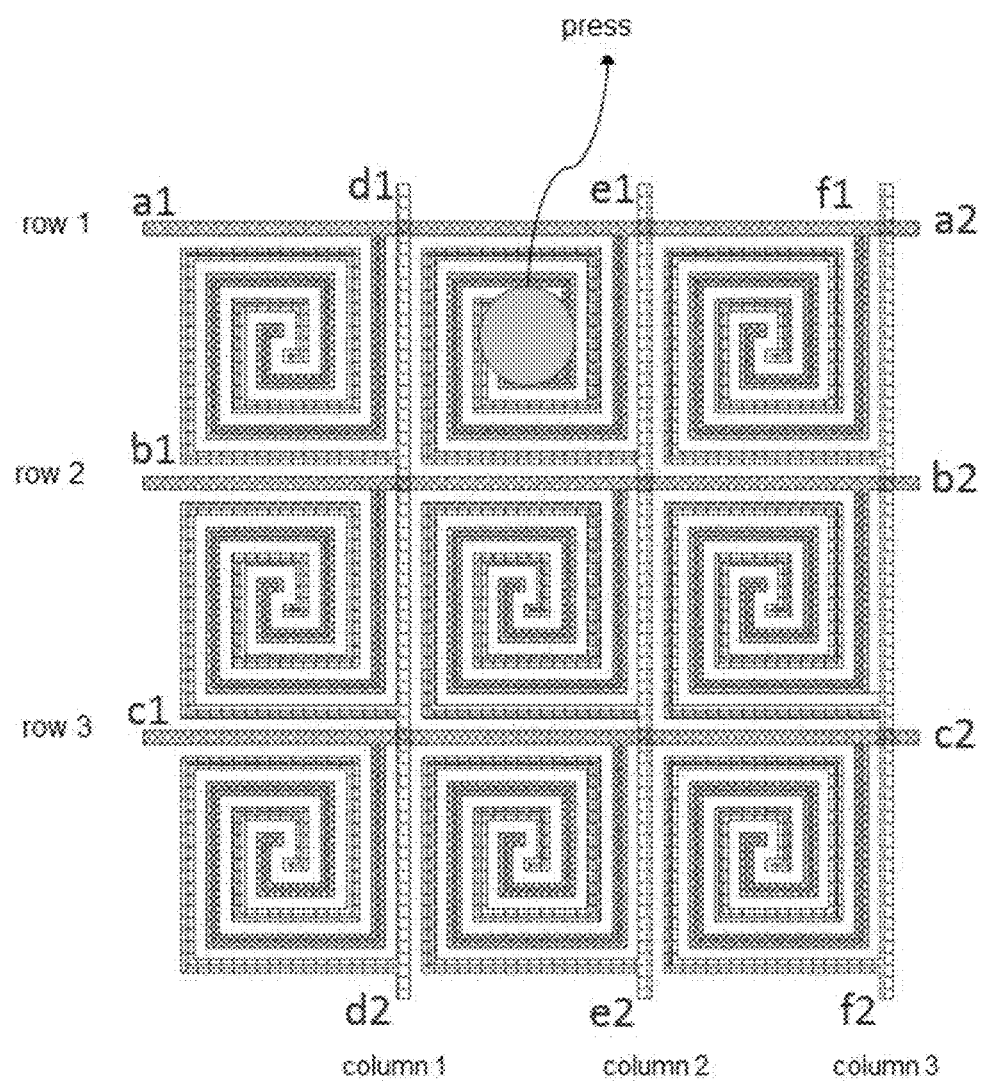
FIG. 8 is a structural diagram of a touch panel according to an embodiment of the present disclosure.

For example, as illustrated in FIG. 8, an area formed by 3×3 function sensing units changes impedances of a1 port to a2 port when a finger is pressed, and this can determine that a pressing position coordinate is at Row1. When impedances of e1 port to e2 port change, it can be determined that the pressing position coordinate is in Col2. Information of the two can be combined to determine the pressing position coordinate is (Row 1, Col2). Combined with an impedance variation of the touch sensing electrode pattern or the touch driving electrode pattern, magnitude of the pressure can be determined.

In an embodiment, the embodiment of the present disclosure further provides a display device including a display panel, a touch panel, and a cover plate. The touch panel includes a flexible substrate, a first electrode, a second electrode, a touch chip, and a pressure sensing chip. The first electrode is disposed on the flexible substrate. The second electrode is disposed on the flexible substrate. The second electrode is insulated from the first electrode to form a capacitor. A resistance of the first electrode is correlated with a shape variable of the flexible substrate. Because the resistance of the first electrode correlated with the shape variable of the flexible substrate, the shape variable of the flexible substrate can be obtained according to the resistance of the first electrode. The shape variable of the flexible substrate is positively correlated with the pressure of the pressure pressed by the user, that is, the magnitude of the pressure pressed by the user can be determined according to the resistance of the first electrode, thereby implementing the pressure sensing performance. The second electrode is insulated from the first electrode to form the capacitor structure. The touch operation of the user can be determined according to the change of the capacitance. That is, the touch panel in the embodiment of the present disclosure can simultaneously implement the touch and pressure sensing performances, such that the pressure sensing performance can be realized without adding a pressure sensing layer in the terminal. The technical problem that the current terminal needs to add the pressure sensing layer to realize the pressure sensing performance is solved, and a thickness of a device is reduced.

In an embodiment of the present disclosure, the first electrode includes a first stem and at least one first branch, a length of the first branch increases as a shape variable of the flexible substrate increases, and a resistance value of the first branch is positively correlated with a length value of the first branch.

In an embodiment of the present disclosure, the first branch is a conductive loop formed by a hollow wire.

In an embodiment of the present disclosure, the first branch is a swing configuration.

In an embodiment of the present disclosure, the pressure sensing chip is further electrically connected to the second electrode and identifies a pressing operation according to a change in the resistance value of the first electrode and a change in a resistance value of the second electrode, the second electrode includes a second stem and at least one second branch, a length of the second branch increases as the shape variable of the flexible substrate increases, and a resistance value of the second branch is positively correlated with a length value of the second branch.

In an embodiment of the present disclosure, projections of the first branch and the second branch on a surface of the flexible substrate do not overlap.

In an embodiment of the present disclosure, the second branch and the first branch are conductive loops formed by hollow wires, and the second branch and the first branch are arranged in a spiral shape.

In an embodiment of the present disclosure, the second electrode is disposed in a same layer as the first electrode.

In an embodiment of the present disclosure, the second electrode and the first electrode are each patterned by a transparent conductive layer.

In an embodiment of the present disclosure, one of the first electrode and the second electrode is a signal sensing electrode, and the other of the first electrode and the second electrode is a signal driving electrode.

According to the above embodiment, the embodiment of the present disclosure provides a new touch panel and display device, which include a flexible substrate, a first electrode, a second electrode, a touch chip, and a pressure sensing chip. The first electrode is disposed on the flexible substrate. A shape of the first electrode is deformed according to deformation of the flexible substrate. A resistance value of the first electrode is correlated with a shape variable of the shape of the first electrode. The second electrode is disposed on the flexible substrate. The second electrode is insulated from the first electrode to form a capacitor. The touch chip is electrically connected to the first electrode and the second electrode to identify a touch operation according to a change in a capacitance value of the capacitor. The pressure sensing chip is electrically connected to at least the first electrode and identifies a pressing operation according to a change in the resistance value of the first electrode. In this structure, the shape of the first electrode is deformed according to the deformation of the flexible substrate, and the resistance value of the first electrode is correlated with the shape variable of the shape of the first electrode, such that the shape variable of the flexible substrate can be determined according to the resistance of the first electrode, and the shape variable of the substrate is positively correlated with the pressure pressed by a user. That is, the pressure pressed by the user can be determined according to the resistance of the first electrode, thereby implementing the pressure sensing performance while the second electrode forming a capacitive structure with the first electrode. The touch operation of the user can be determined according to the change of the capacitance. That is, the touch panel of the embodiment of the present disclosure can simultaneously implement the touch and pressure sensing performances through the first electrode and the second electrode. In this way, it is not necessary to add an independent pressure sensing layer in a terminal, thereby realizing the pressure sensing performance, and solving the technical problem that the current terminal needs to add the independent pressure sensing layer to realize the pressure sensing performance.

In the above, although the present disclosure has been disclosed in the above preferred embodiments, the preferred embodiments are not intended to limit the present disclosure, and those skilled in the art can make various modifications and refinements without departing from the spirit and scope of the present disclosure. The protected scope of the present disclosure is therefore defined by the scope of the claims.

What is claimed is:

1. A touch panel, comprising:
    a flexible substrate;
    a first electrode disposed on the flexible substrate, a shape of the first electrode being deformed according to deformation of the flexible substrate, and the first electrode comprising a first stem and at least one first branch, wherein a length of the first branch increases as a shape variable of the flexible substrate increases, and a resistance value of the first branch is positively correlated with a length value of the first branch;
    a second electrode disposed on the flexible substrate insulated from the first electrode to form a capacitor, the second electrode comprising a second stem and at least one second branch, wherein a length of the second branch increases as the shape variable of the flexible substrate increases, and a resistance value of the second branch is positively correlated with a length value of the second branch;
    a touch chip electrically connecting the first electrode and the second electrode to identify a touch operation according to a change in a capacitance value of the capacitor; and
    a pressure sensing chip electrically connecting the first electrode and the second electrode, configured to identify a pressing operation according to a change in the resistance value of the first electrode and a change in a resistance value of the second electrode,
    wherein projections of the first branch and the second branch on a surface of the flexible substrate do not overlap and the projection of the second branch is in a gap of a projection of the first electrode.

2. The touch panel according to claim 1, wherein the first branch is a conductive loop formed by a hollow wire.

3. The touch panel according to claim 1, wherein the second branch and the first branch are conductive loops formed by hollow wires, and the second branch and the first branch are arranged in a spiral shape.

4. The touch panel according to claim 1, wherein the second electrode and the first electrode are each patterned by a transparent conductive layer.

5. The touch panel according to claim 1, wherein one of the first electrode and the second electrode is a signal sensing electrode, and the other of the first electrode and the second electrode is a signal driving electrode.

6. A display device comprising a touch panel, the touch panel comprising:
    a flexible substrate;
    a first electrode disposed on the flexible substrate, a shape of the first electrode being deformed according to deformation of the flexible substrate, and the first electrode comprising a first stem and at least one first branch, wherein a length of the first branch increases as a shape variable of the flexible substrate increases, and a resistance value of the first branch is positively correlated with a length value of the first branch;
    a second electrode disposed on the flexible substrate and insulated from the first electrode to form a capacitor, the second electrode comprising a second stem and at least one second branch disposed over the first branch, wherein a length of the second branch increases as the shape variable of the flexible substrate increases, and a resistance value of the second branch is positively correlated with a length value of the second branch;
    a touch chip electrically connecting the first electrode and the second electrode to identify a touch operation according to a change in a capacitance value of the capacitor; and
    a pressure sensing chip electrically connecting the first electrode and the second electrode, configured to identify a pressing operation according to a change in the resistance value of the first electrode and a change in a resistance value of the second electrode,
    wherein projections of the first branch and the second branch on a surface of the flexible substrate do not overlap and the projection of the second branch is in a gap of a projection of the first electrode.

7. The display device according to claim 6, wherein the first branch is a conductive loop formed by a hollow wire.

8. The display device according to claim 6, wherein the second branch and the first branch are conductive loops formed by hollow wires, and the second branch and the first branch are arranged in a spiral shape.

9. The display device according to claim 6, wherein the second electrode and the first electrode are each patterned by a transparent conductive layer.

10. The display device according to claim 6, wherein one of the first electrode and the second electrode is a signal sensing electrode, and the other of the first electrode and the second electrode is a signal driving electrode.

* * * * *